UNITED STATES PATENT OFFICE.

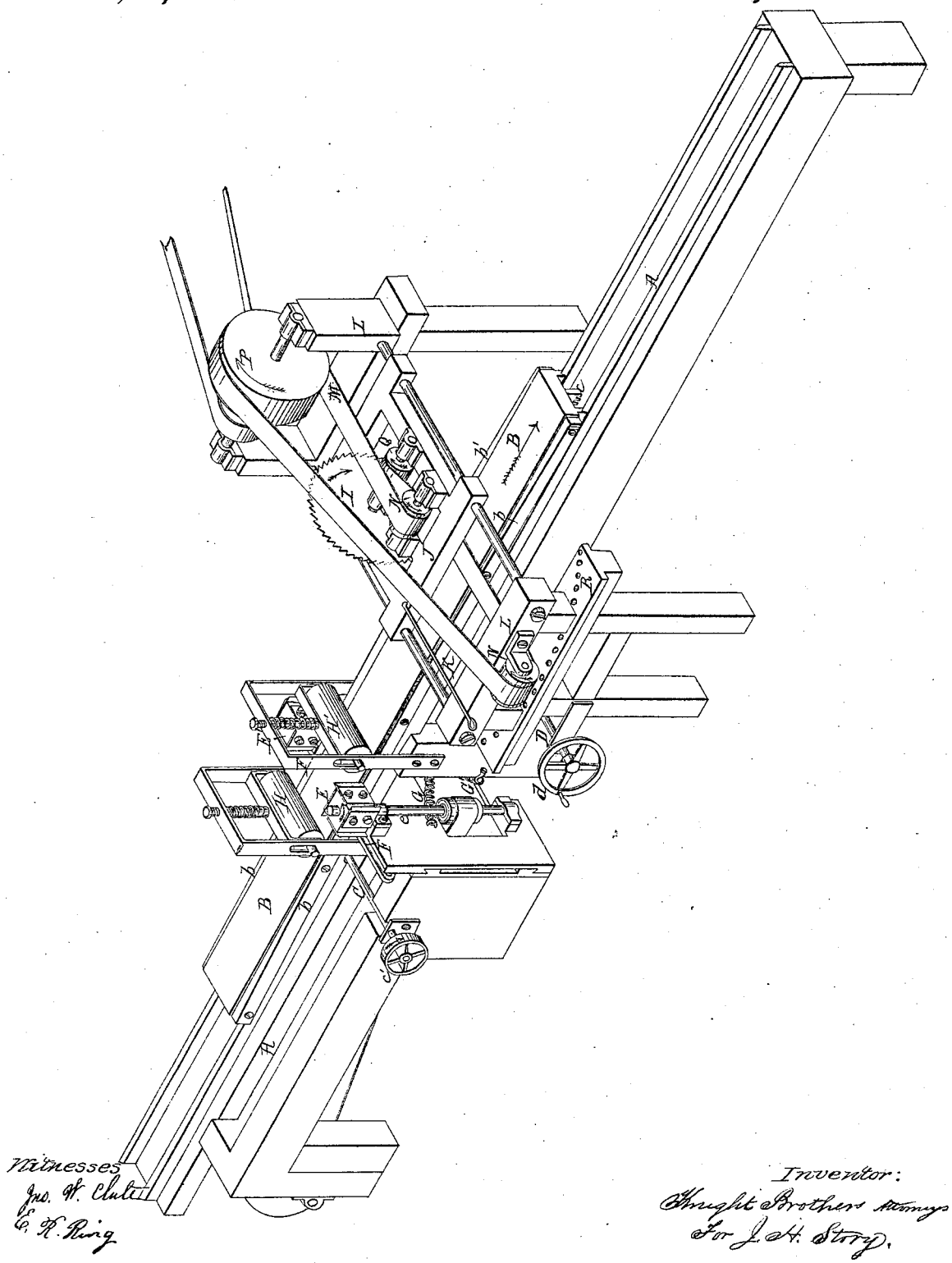

JEREMIAH H. STORY, OF CINCINNATI, OHIO, ASSIGNOR TO CAMERON, STORY & MALONE, OF HAMILTON, OHIO.

MACHINE FOR DRESSING JOISTS.

Specification of Letters Patent No. 29,749, dated August 21, 1860.

*To all whom it may concern:*

Be it known that I, JEREMIAH H. STORY, of Cincinnati, Hamilton county, Ohio, have invented a certain new and useful Machine for Preparing Joists and Girders; and I do hereby declare the following to be a full and exact description thereof, reference being had to the accompanying drawing, making part of this specification and being a perspective view of the machine.

A are ways, at least twice the length of the longest joists.

B is a carriage adapted to travel on said ways. The edges of the carriage B have attached to them patterns $b$ $b'$ formed with the exact curves desired for the upper and lower edges of the joist. The carriage B is advanced and retracted along the ways A by means of a driving shaft C whose pinion gears into a rack $c$ beneath the carriage.

C' is a driving pulley upon the shaft C.

D is an auxiliary feed shaft also acting on the rack $c$. This shaft is provided with a hand wheel $d$ and is designed to enable the stuff to be brought to the exact spots for end trimming as hereinafter explained.

E E' are cutter heads rotating on vertical axes $e$ $e'$ and having their boxes F held in contact with the patterns $b$ $b'$ by means of springs G G' or equivalent device.

Pressure rollers H H' one on each side of the cutters E E', serve to hold the joists firmly to the carriage.

I is a vertical circular saw journaled in a carriage J, which by means of a rod K' can be drawn to and fro in a horizontal swing frame L capable of vibration upon a vertical pivot M.

Idle pulleys N serve to stretch the band O and preserve an equal pressure of the band upon the driving pulleys P and Q, whatever motion be given to the carriage J.

R is a bench which supports the free end of the swing frame L. This bench is provided with stops which are so adjusted as to limit the sweep of the saw frame to suit the bevel desired for the ends of the joist.

Operation: Patterns being applied to the carriage corresponding to the respective contours desired for the two edges of the joist and the carriage being sufficiently backed, the rough joist is placed upon it and the feed being applied, the joist is drawn forward thereby between the cutters until its forward end reaches the place of the saw I whose frame, being then brought to one extremity of its sweep, the carriage J is drawn forward so as to saw off the end of the joist to the desired angle. The saw I being then run back the feed is resumed and again arrested when the back end of the joist reaches the place of the saw I and the frame L being swung to the other extremity of its sweep the saw I is again drawn forward and acts to trim the remaining end of the joist. The hand feed D, enables the carriage to be adjusted to a nicety preparatively to trimming the ends.

Various modifications are obviously possible. For example, where a given uniform camber for both edges is desired a curved track may take the place of the patterns $b$ $b'$, and this track may have its curvature adjusted by set screws. Saws may replace the cutters E E'. Two saws set in frames of the required obliquity may replace the single saw I in its vibrating frame L.

The saw I may obviously be used to impart a square instead of a bevel finish to the ends of the joist whenever so desired.

I claim as new and of my invention herein—

The combination of the saw I carriage J and pivoted swing frame L, constructed arranged and operating substantially as and for the purposes set forth.

In testimony of which invention, I hereunto set my hand.

J. H. STORY.

Witnesses:
GEO. H. KNIGHT,
FRANCIS MILLWARD.